(12) United States Patent
Exall et al.

(10) Patent No.: US 10,042,610 B2
(45) Date of Patent: *Aug. 7, 2018

(54) TRAILING OR LEADING ZERO COUNTER HAVING PARALLEL AND COMBINATIONAL LOGIC

(71) Applicant: Imagination Technologies Limited, Kings Langley (GB)

(72) Inventors: Freddie Rupert Exall, Watford (GB); Theo Alan Drane, London (GB)

(73) Assignee: Imagination Technolgies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,081

(22) Filed: Nov. 12, 2017

(65) Prior Publication Data

US 2018/0067727 A1 Mar. 8, 2018

Related U.S. Application Data

(63) Continuation of application No. 15/426,907, filed on Feb. 7, 2017, now Pat. No. 9,830,131, which is a (Continued)

(30) Foreign Application Priority Data

Jan. 17, 2014 (GB) .................................. 1400814.8

(51) Int. Cl.
*G06F 7/00* (2006.01)
*G06F 7/74* (2006.01)
*G06F 9/30* (2018.01)

(52) U.S. Cl.
CPC ............ *G06F 7/74* (2013.01); *G06F 9/30029* (2013.01)

(58) Field of Classification Search
CPC ............................... G06F 9/30029; G06F 7/74
(Continued)

(56) References Cited

U.S. PATENT DOCUMENTS

2006/0265439 A1 11/2006 Kaplan et al.
2007/0050435 A1 3/2007 Jacobi et al.

OTHER PUBLICATIONS

Schmookler et al., "Leading Zero Anticipation and Detection—A Comparison of Methods," Proceedings of the 15th IEEE Symposium on Computer Arithmetic, pp. 7-12 (2001).

(Continued)

*Primary Examiner* — Tan V. Mai
(74) *Attorney, Agent, or Firm* — Vorys, Sater, Seymour and Pease LLP; Vincent M DeLuca

(57) ABSTRACT

A trailing/leading zero counter is described which comprises a plurality of hardware logic blocks, each of which calculates one bit of the output value (i.e. the number of trailing/leading zeros depending on whether it is a trailing/leading zero counter). Each hardware logic block comprises two blocks of section hardware logic which each receive a section of an input string and generate one or two outputs from this section of bits. Combining logic then combines the outputs of the section hardware logic to generate the bit of the output value. For hardware logic blocks which calculate bits other than the least significant bit of the output, the hardware logic blocks also comprise one or more OR reduction stages which reduces the length of the input string by pairwise combining of bits using OR gates before the resultant string is divided into two sections and input to the section hardware logic.

14 Claims, 11 Drawing Sheets

Related U.S. Application Data continuation of application No. 15/218,306, filed on Jul. 25, 2016, now Pat. No. 9,600,240, which is a continuation of application No. 14/598,459, filed on Jan. 16, 2015, now Pat. No. 9,424,030.

(58) Field of Classification Search
USPC .......................................................... 708/211
See application file for complete search history.

(56) References Cited

OTHER PUBLICATIONS

NPL document in grandparent app'n.

TRAILING OR LEADING ZERO COUNTER HAVING PARALLEL AND COMBINATIONAL LOGIC

BACKGROUND

There are many situations where it is useful to count the number of zeros in a binary number starting from the either the left hand side (i.e. starting with the most significant bit, MSB) or the right hand side (i.e. starting with the least significant bit, LSB). When counting from the most significant bit, this may be referred to as counting leading zeros (e.g. such that a binary number 0111 has one leading zero) and when counting from the least significant bit this may be referred to as counting trailing zeros (e.g. such that a binary number 1110 has one trailing zero and a binary number 1000 has three trailing zeros).

A leading zero counter (which is so called as it counts the leading zeros) may, for example, be used in subtraction and for normalization in floating point arithmetic. It will be appreciated, however, that a trailing zero counter (which is so called as it counts the trailing zeros) may be used as a leading zero counter, and vice versa, by connecting up the inputs such that the true MSB of the input binary number is connected to the LSB input of the trailing/leading zero counter.

The embodiments described below are not limited to implementations which solve any or all of the disadvantages of known leading or trailing zero counters.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A trailing/leading zero counter is described which comprises a plurality of hardware logic blocks, each of which calculates one bit of the output value (i.e. the number of trailing/leading zeros depending on whether it is a trailing/leading zero counter). Each hardware logic block comprises two blocks of section hardware logic which each receive a section of an input string and generate one or two outputs from this section of bits. Combining logic then combines the outputs of the section hardware logic to generate the bit of the output value. For hardware logic blocks which calculate bits other than the least significant bit of the output, the hardware logic blocks also comprise one or more OR reduction stages which reduces the length of the input string by pairwise combining of bits using OR gates before the resultant string is divided into two sections and input to the section hardware logic.

A first aspect provides a zero counter comprising a plurality of hardware logic blocks (202) each arranged to calculate one bit of an output value, the output value corresponding to a number of trailing or leading zeros in an input string, wherein a first of the plurality of hardware logic block is arranged to calculate a least significant bit of the output value and comprises: a low section hardware logic block comprising inputs arranged to receive bits from a first section of the input string including a least significant bit in the input string and one or more logic gates arranged to combine the received bits and generate at least one output; a high section hardware logic block comprising inputs arranged to receive bits from a second section of the input string including a most significant bit in the input string and one or more logic gates arranged to combine the received bits and generate at least one output, wherein the first and second sections of the input string are non-overlapping and comprise all the bits in the input string; and combining logic arranged to combine the outputs of the two section hardware logic blocks and generate the least significant bit of the output value, and wherein each other hardware logic block in the plurality of hardware logic blocks is arranged to calculate a bit of index i of the output value and comprises: i OR reduction stages arranged in series, a first OR reduction stage arranged to receive the input string and comprising one or more OR gates arranged to combine adjacent bits in the input string to generate an output string and any subsequent OR reduction stages arranged to receive the output string from a preceding OR reduction stage and comprising one or more OR gates arranged to combine adjacent bits in the received string to generate a further output string; a low section hardware logic block comprising inputs arranged to receive bits from a first section of the string output by a last OR reduction stage in the series, the first section including a least significant bit in the received string and one or more logic gates arranged to combine the received bits and generate at least one output; a high section hardware logic block comprising inputs arranged to receive bits from a second section of the string output by a last OR reduction stage in the series, the second section including a most significant bit in the received string and one or more logic gates arranged to combine the received bits and generate at least one output, wherein the first and second sections of the received string are non-overlapping and comprise all the bits in the received string; and combining logic arranged to combine the output of the two section hardware logic blocks and generate a bit of index i of the output value.

A second aspect provides a computer readable storage medium having encoded thereon computer readable program code for generating a processor comprising a zero counter, the zero counter comprising a plurality of hardware logic blocks each arranged to calculate one bit of an output value, the output value corresponding to a number of trailing or leading zeros in an input string, wherein a first of the plurality of hardware logic block is arranged to calculate a least significant bit of the output value and comprises: a low section hardware logic block comprising inputs arranged to receive bits from a first section of the input string including a least significant bit in the input string and one or more logic gates arranged to combine the received bits and generate at least one output; a high section hardware logic block comprising inputs arranged to receive bits from a second section of the input string including a most significant bit in the input string and one or more logic gates arranged to combine the received bits and generate at least one output, wherein the first and second sections of the input string are non-overlapping and comprise all the bits in the input string; and combining logic arranged to combine the outputs of the two section hardware logic blocks and generate the least significant bit of the output value, and wherein each other hardware logic block in the plurality of hardware logic blocks is arranged to calculate a bit of index i of the output value and comprises: i OR reduction stages arranged in series, a first OR reduction stage arranged to receive the input string and comprising one or more OR gates arranged to combine adjacent bits in the input string to generate an output string and any subsequent OR reduction stages arranged to receive the output string from a preceding OR reduction stage and comprising one or more OR gates arranged to combine adjacent bits in the received string to generate a further output string; a low section hardware logic block comprising inputs arranged to receive bits from a first section of the string output by a last OR reduction stage in the series, the first section including a least significant bit in the received string and one or more logic gates arranged to combine the received bits and generate at least one output; a high section hardware logic block comprising inputs arranged to receive bits from a second section of the string output by a last OR reduction stage in the series, the second section including a most significant bit in the received string and one or more logic gates arranged to combine the received bits and generate at least one output, wherein the first and second sections of the received string are non-overlapping and comprise all the bits in the received string; and combining logic arranged to combine the output of the two section hardware logic blocks and generate a bit of index i of the output value.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
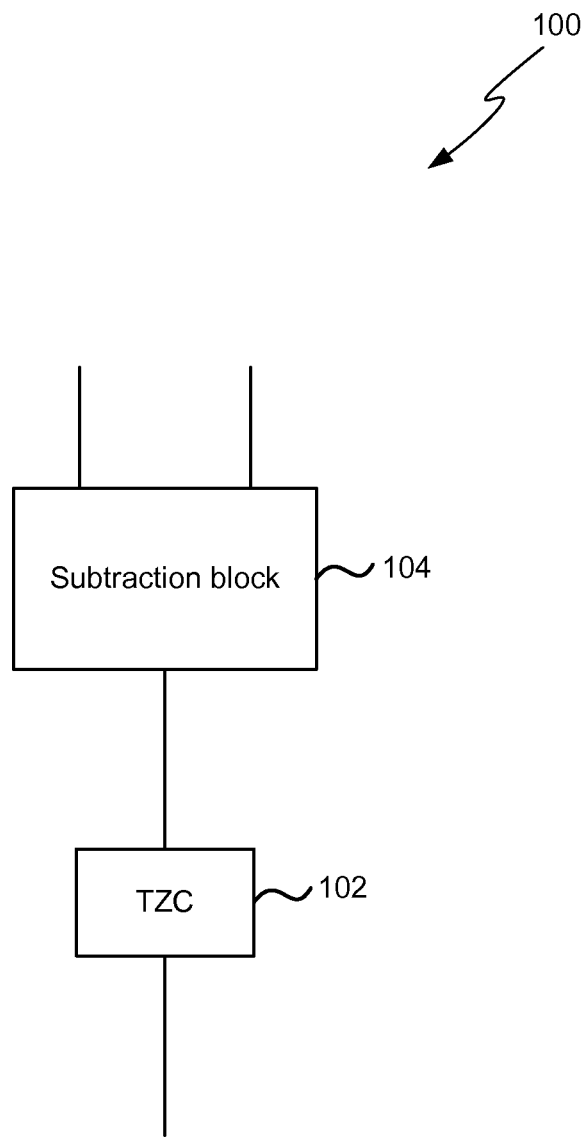
FIG. 1 is a schematic diagram of hardware logic comprising a trailing zero counter (TZC) which follows a block of logic which, in this example, performs subtraction.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, there are many applications where it is useful to know the number of trailing zeros in a binary number or string (as counted from the least significant bit), such as when performing normalization or subtraction. As further described above, a trailing zero counter (TZC) may also be used to count zeros from the most significant bit, i.e. it may be used as a leading zero counter (LZC) by connecting up the inputs in reverse order.

FIG. 1 shows a schematic diagram of some hardware logic 100 comprising a trailing zero counter (TZC) 102 which follows a block of logic 104 which in this example performs subtraction. The subtraction block 104 does not necessarily output the bits of the result in order and there may be a delay before the TZC 102 receives all the bits of the result. A particular TZC instance will have a preferred arrival time for each bit and this is known as its "timing profile". Some TZCs may benefit from a high bit arriving before a lower bit and will start calculating as soon as the MSB arrives while it waits for the LSB, for example. Other TZC circuits may prefer the opposite.

An improved trailing zero counter is described below which operates quickly and efficiently and can be designed to have a timing profile which can be tailored to substantially match the delay profile of any preceding logic (e.g. subtraction block 104 in the example of FIG. 1). Within the hardware logic in the trailing zero counter, the different bits in the output result (which is the number of trailing zeros) may be calculated in parallel. These bits may be denoted TZC(i) where i is the bit index. To calculate any of the bits TZC(i) the input string (or number) is recursively split into two non-overlapping sections, a "high" section and a "low" section such that the bits in each section can be processed substantially in parallel when performing the trailing zero calculation. The split between high and low sections can be positioned anywhere within the input number (i.e. the two sections may contain different numbers of bits) and so in various examples the position of the split may be chosen to allow balancing of the implementation such that the arrival times of the input bits (from the input number) suit the paths through the TZC logic, e.g. a section of bits which arrive first can be processed ahead of a section of bits which arrive later. In some examples the high and low sections may comprise the same number of bits and in other examples the high and low sections may comprise different numbers of bits. Although the calculation of each of the output bits of the TZC may be performed in parallel, in some examples, there may be some reuse of values and/or hardware logic elements. The improved TZC hardware logic described herein increases the ability to parallelize computation through its design which increases the speed of the TZC calculation.

Figure 2:
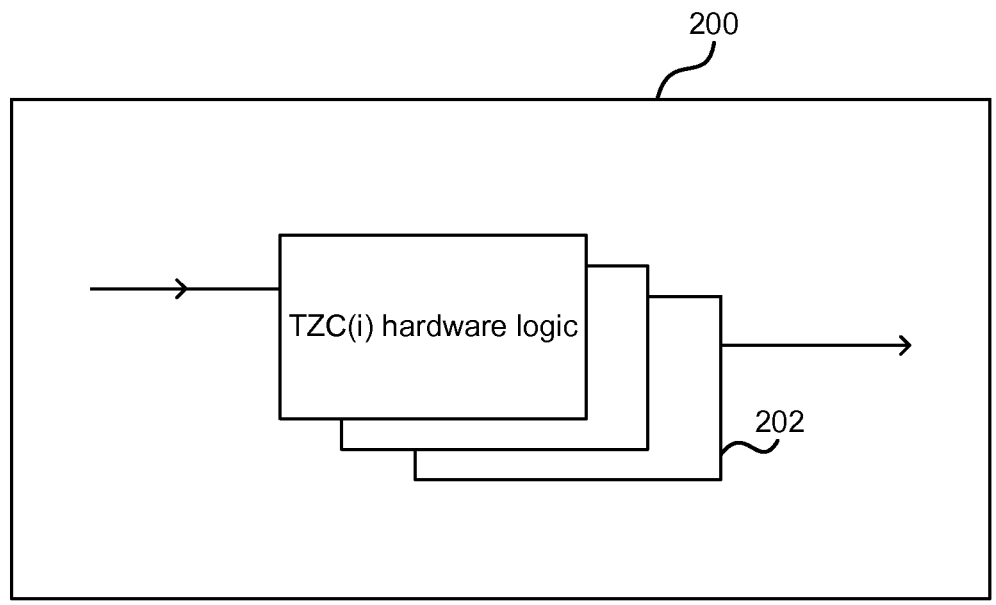
FIG. 2 is a schematic diagram showing an example trailing zero counter implemented in hardware logic.
Figure 3:
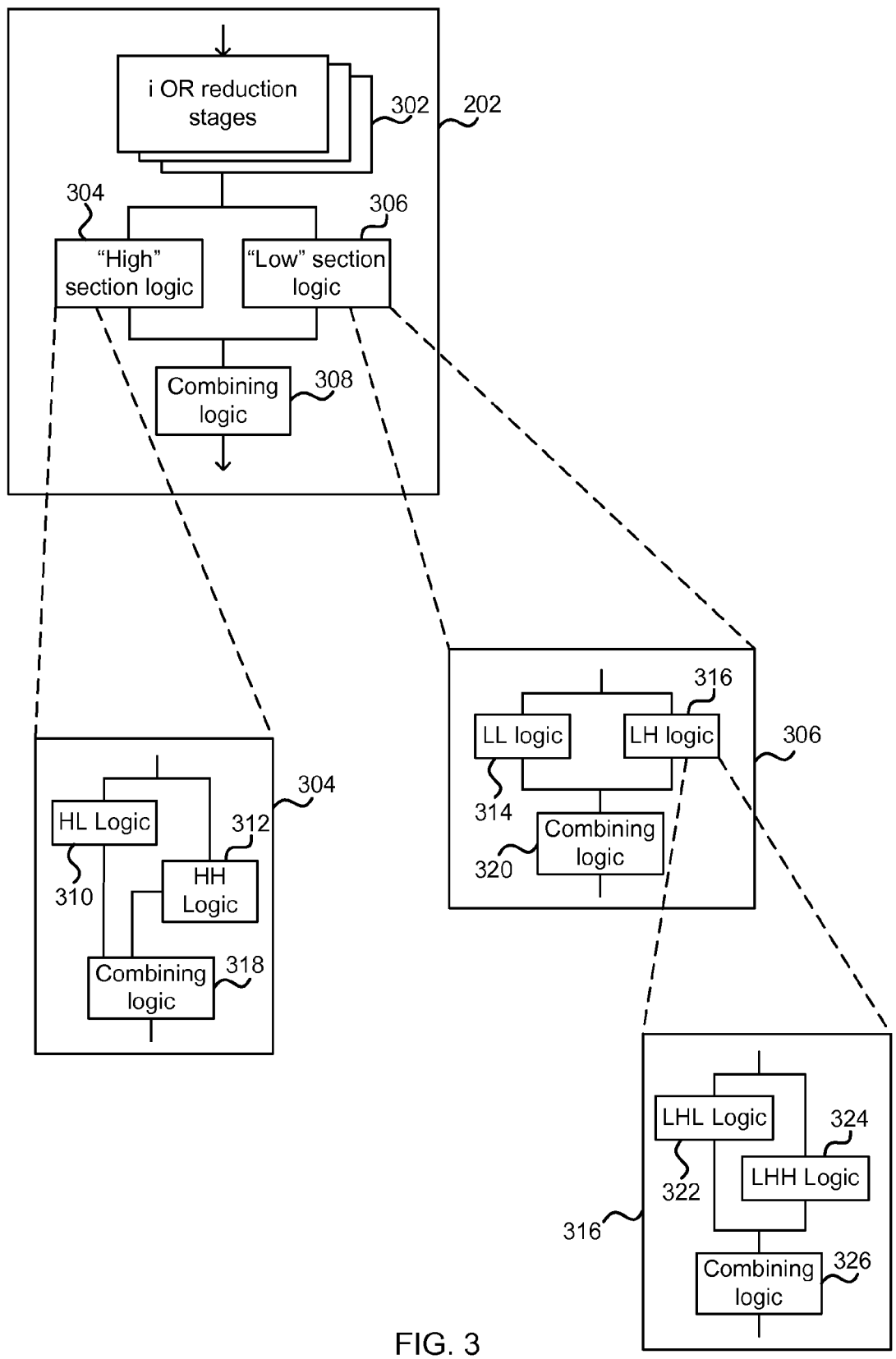
FIG. 3 is a schematic diagram showing an example TZC(i) hardware logic block.

FIG. 2 is a schematic diagram showing an example trailing zero counter 200 implemented in hardware logic. The TZC may, for example, be incorporated within a processor (e.g. a CPU or GPU) or a piece of non-programmable logic. The TZC 200 comprises a plurality of hardware logic blocks 202, each arranged to calculate one bit of the output from the TZC, denoted TZC(i), with i being the bit index. FIG. 3 is a schematic diagram showing an example TZC(i) hardware logic block 202. The TZC(i) hardware logic block 202 may comprise i OR reduction stages 302, a "high" section logic block 304, a "low" section logic block 306 and combining logic 308.

Figure 9:
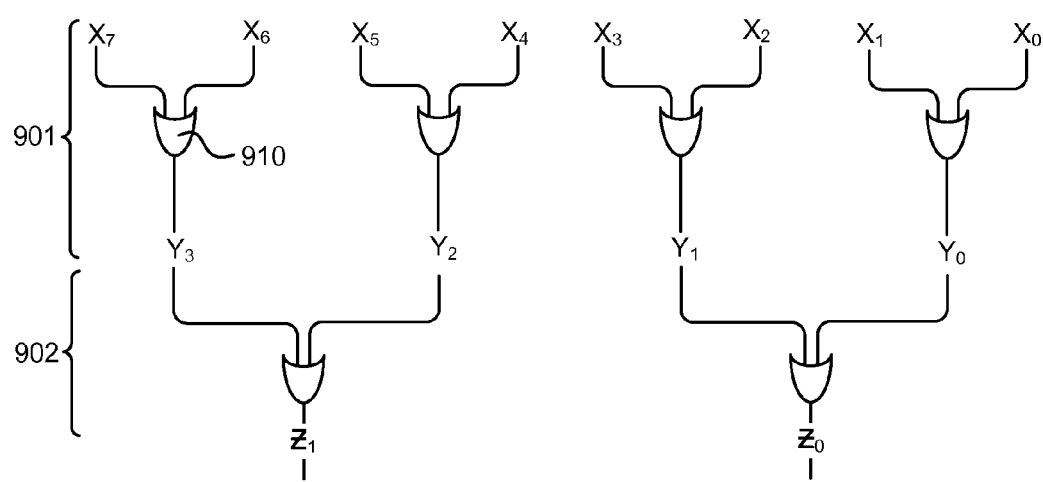
FIG. 9 is a schematic diagram showing the operation of a series of OR reduction stages.
Figure 11:
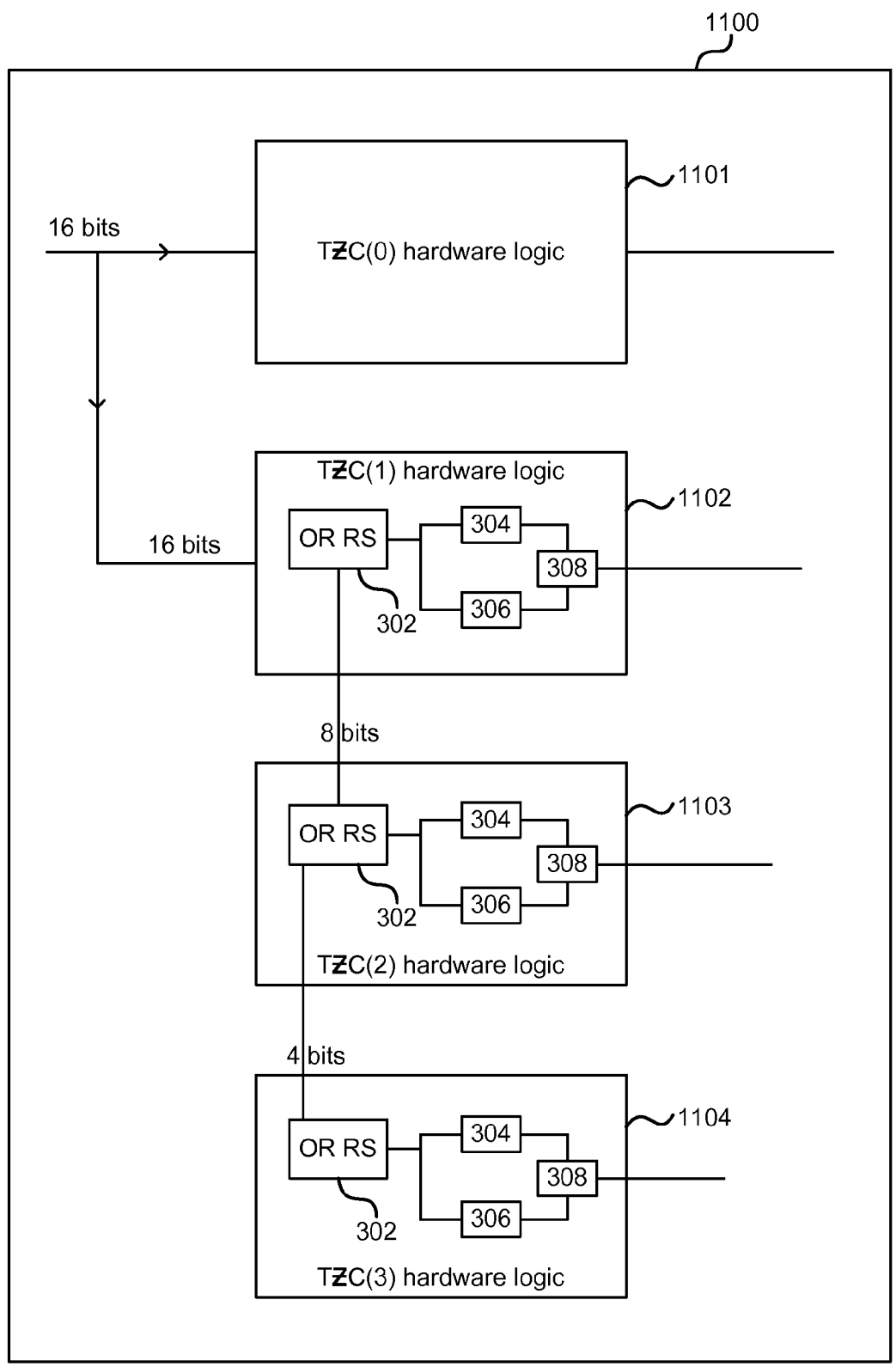
FIG. 11 shows a schematic diagram of an example TZC which comprises 4 TZC(i) hardware logic blocks and in which the OR reduction stages are shared between TZC(i) hardware logic blocks.

The number of OR reduction stages in a TZC(i) hardware logic block 202 will depend on which bit in the output of the TZC is being calculated and consequently there may be none, one or more OR reduction stages. A TZC(i) hardware logic block 202 arranged to calculate bit i of the output of the TZC comprises i OR reduction stages 302, such that a TZC(0) hardware logic block (which is arranged to calculate the least significant bit of the output TZC(0)) does not comprise any OR reduction stages 302, a TZC(1) hardware logic block comprises one OR reduction stage 302, a TZC(2) hardware logic block comprises two OR reduction stages 302, etc. Where there is more than one OR reduction stage 302 (e.g. for i≥2), they are arranged in series such that the output of the first OR reduction stage 302 feeds into the second OR reduction stage (where there is a second OR reduction stage) and the output of the second OR reduction stage feeds into the next OR reduction stage (where there is a third OR reduction stage), etc. e.g. as shown in FIG. 9 and described below. Although these TZC(i) hardware logic blocks 202 are shown and described separately, in some examples there may be re-use of values and/or hardware logic elements between the hardware logic blocks 202 and in particular, there may be re-use of OR reduction stages 302 between TZC(i) hardware logic blocks 202 (e.g. as shown in FIG. 11 described below).

Figure 4:
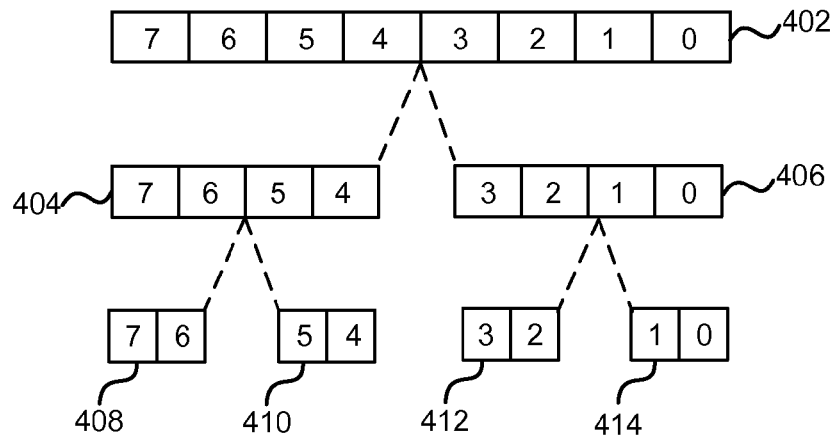
FIG. 4 shows a schematic diagram of two example binary strings and the recursive splitting of the strings into subsections.
Figure 4:
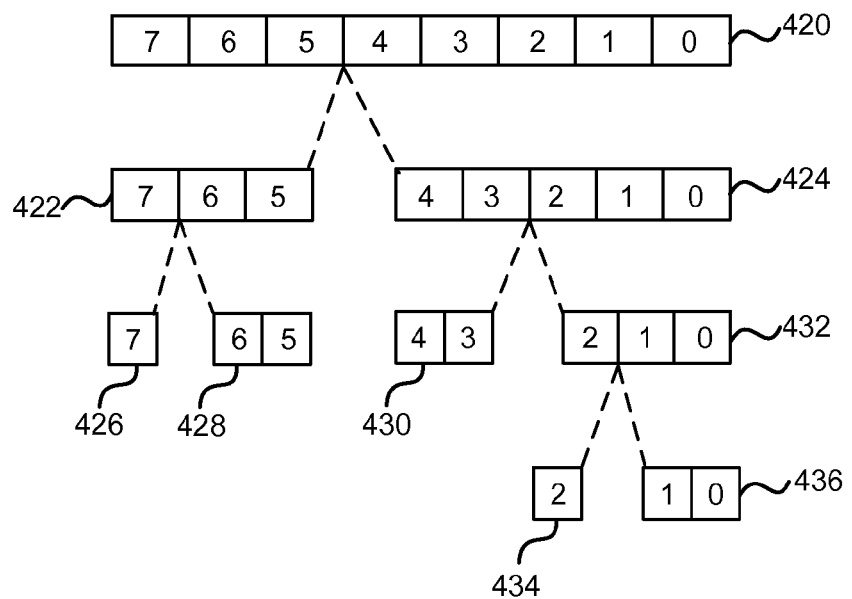

The "high" section logic block 304 and "low" section logic block 306 each receive part of the binary string output by the last OR reduction stage 302 (i.e. a subset of the bits in the binary string) or for the TZC(0) hardware logic block 202, where there is not an OR reduction stage, each of the "high" section logic block 304 and "low" section logic block 306 receive part of (i.e. a subset of) the input binary string. FIG. 4 shows a schematic diagram of two example binary strings 402, 420 each comprising 8 bits (labeled 0-7 such that i=0-7) which may be strings output by the final OR reduction stage (for or may be input strings (for i=0). The least significant bit of the string (i=0) is shown on the right hand side in the standard way. It will be appreciated that in practice these strings may comprise any number of bits and 8 bits are shown by way of example only.

As shown in FIG. 4, the first example string 402 is divided into two sections 404, 406: a "high" section 404 which includes the most significant bit in the string (i=7) and a "low" section 406 which includes the least significant bit in the string (i=0). The sections are non-overlapping and each section comprises a contiguous set of bits (each comprising one or more bits) such that each bit from the string occurs in one of the sections. The "high" section 404 is input to the "high" section logic block 304 whilst the "low" section 406 is input to the "low" section logic block 306.

Although in the first example, the sections 404, 406 are shown as each comprising the same number of bits (e.g. they are of equal length), in other examples, the sections may have different lengths, as shown in the second example, and as described above the section split may be positioned based on knowledge of the delay profile of preceding logic. For example, if bits 0-3 are typically delayed such that bits 4-7 arrive before them at the TZC, a split of the input string 402 as shown in the first example may be used and this means that the calculation involving bits 4-7 can potentially start ahead of the arrival of bits 0-3 at the TZC. If however, bits 5-7 are typically delayed, the split may be positioned differently e.g. as shown in the second example in FIG. 4 where the binary string 420 is divided into two unequal sections 422, 424 with the "high" section 422 comprising bits 5-7 and the "low" section comprising the remaining bits (bits 0-4).

As shown in FIG. 4, the sections of the string may be recursively split into smaller subsections 408-414, 426-436 and as a result the hardware logic may be similarly structured as shown in FIG. 3. with "high" or "low" subsection logic blocks 310-316 within the "high" and "low" section logic blocks 304, 306 and potentially lower level "high" or "low" subsection logic blocks 322-324 within those "high" or "low" subsection logic blocks 310-316. It will be seen from the examples, there is no hardware which actually splits the input string, but instead the splitting refers to the partitioning of the hardware logic that receives the different bits of the input string. As demonstrated by the examples shown in FIGS. 5-7 described below, although it is possible to clearly separate out the "high" and "low" section logic blocks, depending on the way that the sections and subsections are divided, it may not be possible to clearly separate out the groups of logic elements (e.g. groups of logic gates) which correspond to the subsections.

As with the dividing of the string, when dividing sections or subsections, the position of the split may be placed anywhere, such that the subsections may be the same length (e.g. sections 408-414 in the first example) or have different lengths (e.g. sections 426-432 in the second example) and in some examples, the split may be positioned based on design knowledge regarding the arrival times of the different bits within the input string at the TZC. Again when splitting a section into subsections, the subsections each comprise a contiguous set of bits, the subsections are non-overlapping and each bit in the section is contained within one of the two subsections. The same applies when a subsection is divided into two smaller subsections.

In some examples, the recursive splitting of the input string may result in subsections comprising two bits. This may provide an efficient implementation (e.g. providing the arrival times of each bit in the subsection is similar) as it maximizes the amount of computation which can be performed in parallel and results in few rounds of computation (e.g. as demonstrated by FIG. 4 where the first example comprises three levels of splitting and the second example comprises four levels of splitting).

The operation of a TZC(0) hardware logic block 202 (which computes the LSB of the TZC) is now described in more detail and the operation of other TZC(i) hardware logic blocks 202 for i>0 is described subsequently. The value of TZC(0) is 1 (high) when the input string has a trailing one in an odd-indexed column (or position), for example where the input string is 1010101000 (trailing 1 in position 3) or 1010101010 (trailing 1 in position 1). This function may be denoted G(v) where v is the input vector (e.g. the input string for TZC(0)). The computation of G(v) may be split into two, parallel chunks by determining that G(v)=1 if there is:

no trailing one in an even index of the lower section; and
a one in an odd index of the lower section or a trailing one in an odd index of the upper section.

Here the terms 'odd' and 'even' are universal (e.g. such that a bit in an even column of the whole string is still in an even column of the section it is in, irrespective of how the string is split into two sections), whilst the term 'trailing' only refers to the part (e.g. the section or subsection) of the vector that is being considered (e.g. such that you can have a trailing one in either or both sections).

The recursion for G(v) can therefore be written as:

$$G(v)=D(v_L)\cdot(B(v_L)+G(v_H)) \quad (1)$$

where:
 $v_L$ is the "low" section of v (e.g. section 406 in FIG. 4)
 $v_H$ is the "high" section of v (e.g. section 404 in FIG. 4)
 D(v)=1 if there is no trailing 1 in an even column of v
 B(v)=1 if there is a 1 in an odd indexed column of v
 · represents the AND function
 + represents the OR function Furthermore, D(v) can be split up as G(v), such that:

$$D(v)=D(v_L)\cdot(B(v_L)+D(v_H)) \quad (2)$$

and B(v) can also be split as:

$$B(v)=B(v_H)+B(v_L) \quad (3)$$

Using equations (1)-(3), the expression for G(v) can be split recursively until it is operating on arbitrarily short sections of the input vector (e.g. on subsections comprising one or two bits). These equations (1)-(3) are implemented in hardware logic, e.g. in the form of OR, AND and NOT gates, within the TZC(0) hardware logic block 202.

Figure 5:
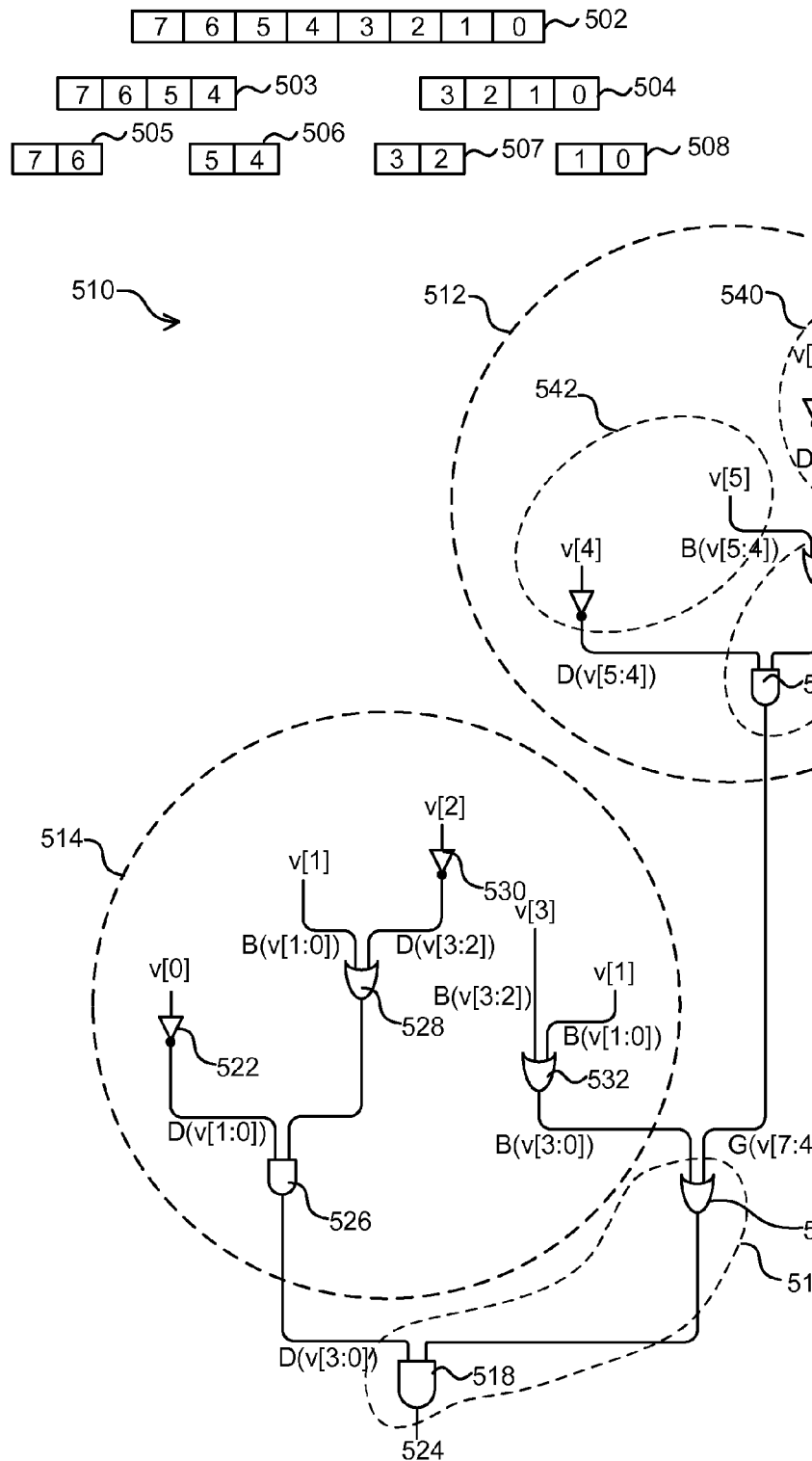
FIG. 5 shows a schematic diagram of an input string and an example way in which this might be recursively split into sections and subsections and an example of the hardware logic within a TZC(0) hardware logic block.

FIG. 5 shows a schematic diagram of an input string (or vector) 502 and a first example way in which this might be recursively split into sections 503-504 and subsections 505-508. The input string 502 may be written as v[7:0], the sections 503-504 may be written as v[7:4] and v[3:0] respectively and the subsections 505-508 may be written as v[7:6], v[5:4], v[3:2] and v[1:0] respectively.

FIG. 5 also shows an example of the hardware logic 510 within a TZC(0) hardware logic block 202. The hardware logic 510 comprises "high" section logic 512, "low" section logic 514 and combining logic 516 and the logic 510-516 in this example is formed from an arrangement of AND 518, OR 520 and NOT 522 gates which implements equations (1)-(3) above.

The correlation between the arrangement of logic gates and equations (1)-(3) can be explained by working backwards through the hardware logic 510 from the output 524 (shown at the bottom of the diagram) and using the notation above for the sections, as follows:

Starting with equation (1):

$$G(v[7:0])=D(v[3:0])\cdot(B(v[3:0])+G(v[7:4]))$$

and this results in one AND gate 518 and one OR gate 520 (the combining logic 516).

The "low" section logic 514 takes the input bits 0-3 and generates D(v[3:0]) and B(v[3:0]). Considering first D(v[3:0]) and using equation (2):

$$D(v[3:0])=D(v[1:0])\cdot(B(v[1:0])+D(v[3:2]))$$

and this results in one AND gate 526 and one OR gate 528. Taking subsection v[1:0] 508, dividing this further into the individual bits and using equation (2) gives:

$$D(v[1:0])=D(v[0])\cdot(B(v[0])+D(v[1]))$$

and since D(v)=1 if there is no trailing 1 in an even column of v, $$D(v[0])=(1 \text{ if } v[0]=0)=\overline{v[0]}$$

D(v[1])=1 (there is no even column in v[1] so there cannot be a trailing 1 in it) and since B(v)=1 if there is a 1 in an odd indexed column of v, B(v[0])=0 (there is no odd indexed column in v[0] so there cannot be a 1 in it)
So:

$$D(v[1:0])=D(v[0])\cdot(B(v[0])+D(v[1]))=\overline{v[0]}\cdot(0+1)=\overline{v[0]}$$

And this results in NOT gate 522.
Similarly, using equation (3):

$$B(v[1:0])=B(v[1])+B(v[0])$$

From above, B(v[0])=0 and since B(v)=1 if there is a 1 in an odd indexed column of v,
B(v[1])=v[1] (as there is only an odd indexed column in v[1])
So:

$$B(v[1:0])=B(v[1])+B(v[0])=v[1]+0=v[1]$$

Taking subsection v[3:2] 507, dividing this further into the individual bits and using equation (2) gives:

$$D(v[3:2])=D(v[2])\cdot(B(v[2])+D(v[3]))$$

Using the same steps as above:

$$D(v[2])=(1 \text{ if } v[2]=0)=\overline{v[2]}$$

B(v[2])=0 (there is no odd indexed column in v[2] so there cannot be a 1 in it)
D(v[3])=1 (there is no even column in v[3] so there cannot be a trailing 1 in it)
So:

$$D(v[3:2])=D(v[2])\cdot(B(v[2])+D(v[3]))=\overline{v[2]}\cdot(0+1)=\overline{v[2]}$$

And this results in NOT gate 530.
Considering next B(v[3:0]) and using equation (3):

$$B(v[3:0])=B(v[3:2])+B(v[1:0])$$

and this results in one OR gate 532. From above:

$$B(v[1:0])=B(v[1])+B(v[0])=v[1]+0=v[1]$$

And similarly:

$$B(v[3:2])=B(v[3])+B(v[2])=v[3]+0=v[3]$$

The "high" section logic 512 takes the input bits 4-7 and generates G(v[7:4]) which is an input to OR gate 520 within the combining logic 516. Using equation (1) and dividing section 503 into two subsections 505-506:

$$G(v[7:4])=D(v[5:4])\cdot(B(v[5:4])+G(v[7:6]))$$

This results in one AND gate 534 and one OR gate 536. Using the same steps as above:

$$D(v[5:4])=D(v[4])\cdot(B(v[4])+D(v[5]))=\overline{v[4]}\cdot(0+1)=\overline{v[4]}$$

$$B(v[5:4])=B(v[5])+B(v[4])=v[5]+0=v[5]$$

And using equation (1) again:

$$G(v[7:6])=D(v[6])\cdot(B(v[6])+G(v[7]))=v[6]\cdot(0+v[7])$$

which results in one AND gate 538.

It can be seen from FIG. 5 that although the logic gates comprising the "high" section logic 512 and "low" section logic 514 can be clearly separated out, this is not possible for the subsection logic within the "low" section logic 514. It is however possible to separate out the "high" subsection logic 540, the "low" subsection logic 542 and the combining logic 544 within the "high" section logic 512. As described above, whether it is possible to separate out the groups of logic gates within the section logic is dependent upon how the initial input string has been divided.

Figure 6:
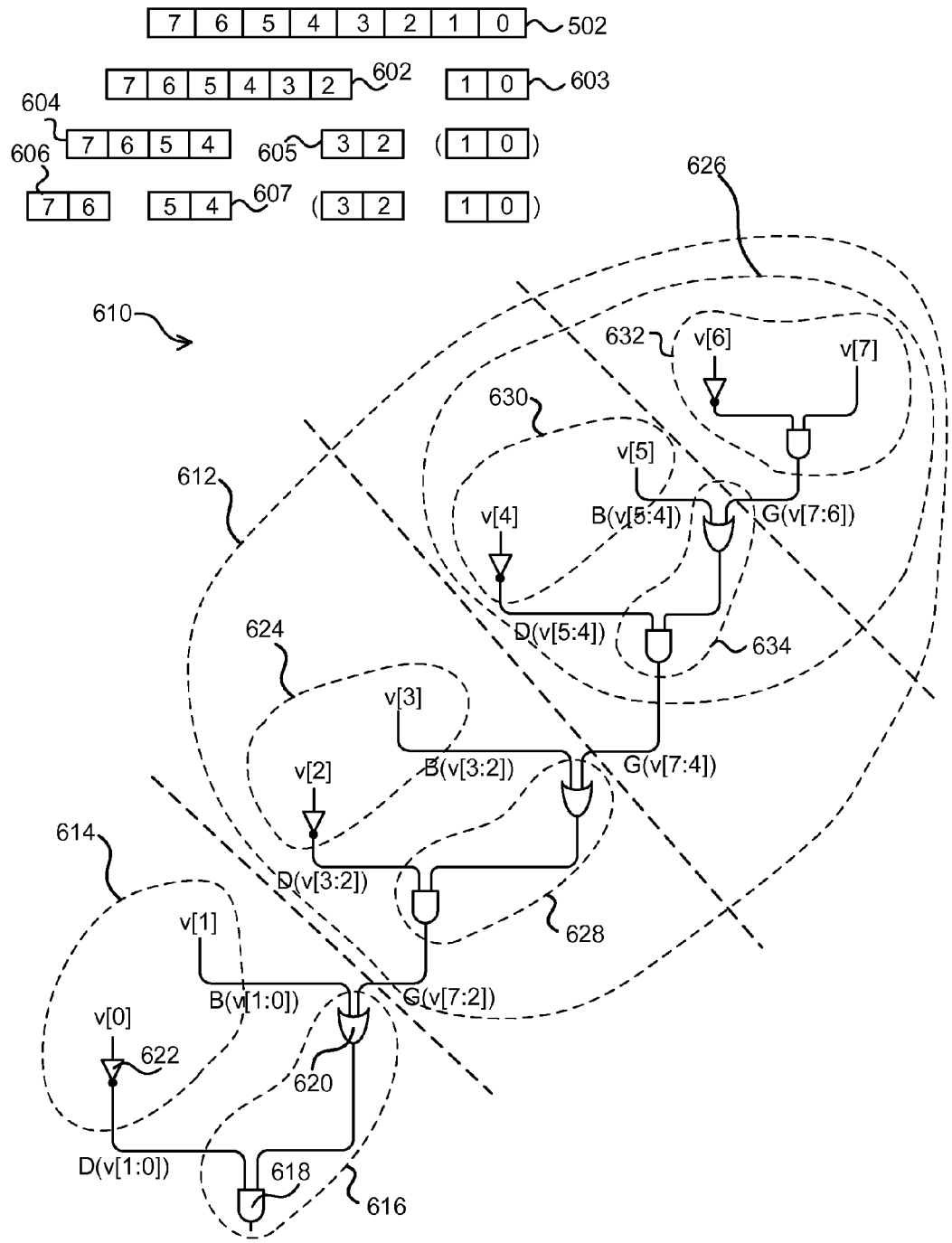
FIG. 6 shows a schematic diagram of an input string and an example way in which this might be recursively split into sections and subsections and an example of the hardware logic within a TZC(0) hardware logic block.

FIG. 6 shows a second example way in which an input string 502 might be recursively split into sections 602-603 and subsections 604-607. FIG. 6 also shows an example of the hardware logic 610 within a TZC(0) hardware logic block 202. The hardware logic 610 comprises "high" section logic 612, "low" section logic 614 and combining logic 616 and the logic 610-616 is again formed from an arrangement of AND 618, OR 620 and NOT 622 gates which implements equations (1)-(3) above.

In this example, the subsection logic within the "high" section logic 612 can be clearly separated out, with logic 624 corresponding to the subsection v[3:2] 605, logic 626 corresponding to the subsection v[7:4] 604 and logic 628 acting as combining logic. At the lowest level, logic 630 corresponds to the subsection v[5:4] 607, logic 632 corresponds to the subsection v[7:6] 606 and logic 634 acting as combining logic.

Figure 7:
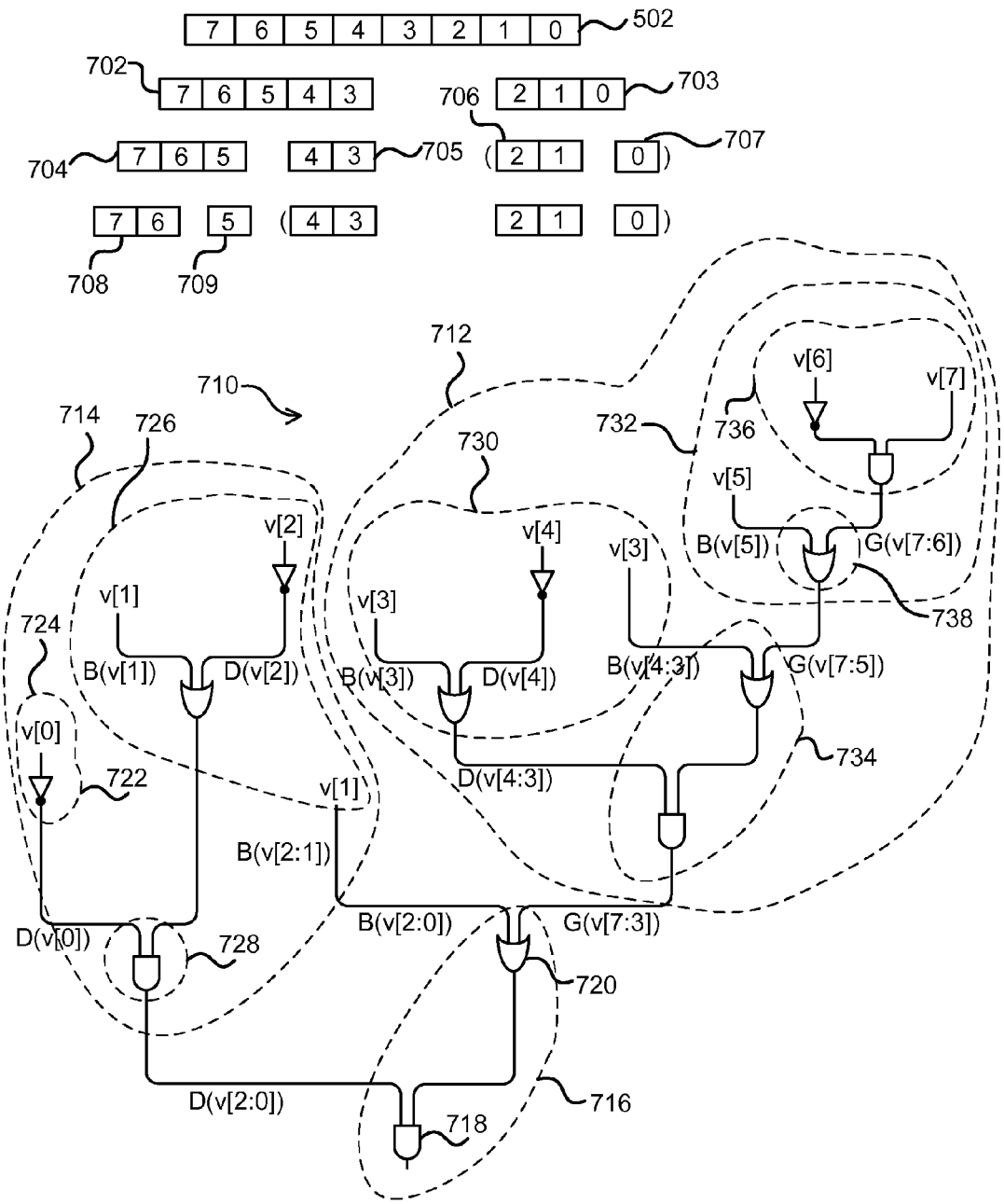
FIG. 7 shows a schematic diagram of an input string and an example way in which this might be recursively split into sections and subsections and an example of the hardware logic within a TZC(0) hardware logic block.

FIG. 7 shows a third example way in which an input string 502 might be recursively split into sections 702-703 and subsections 704-709. FIG. 7 also shows an example of the hardware logic 710 within a TZC(0) hardware logic block 202. The hardware logic 710 comprises "high" section logic 712, "low" section logic 714 and combining logic 716 and the logic 710-716 is again formed from an arrangement of AND 718, OR 720 and NOT 722 gates which implements equations (1)-(3) above.

In this example, the subsection logic within the "low" section logic 714 can be separated out, although less clearly than in some previous examples, with logic 724 corresponding to the subsection v[0] 707, logic 726 corresponding to the subsection v[2:1] 706 and logic 728 acting as combining logic. Within the "high" section logic 712, logic 730 corresponding to the subsection v[4:3] 705, logic 732 corresponding to the subsection v[7:5] 704 and logic 734 acting as combining logic can be separated out. At the lowest level, there is no need for logic corresponding to subsection v[5] 709; however there is logic 736 which corresponds to the subsection v[7:6] 708 and logic 738 acting as combining logic.

FIGS. 5-7 show three different ways in which the TZC(0) hardware logic block 202 may be implemented for an 8-bit input string 502. The total number of gates used in each example roughly corresponds to the amount of area which the circuit will take up and reducing area is often desirable. However, all of the splits given in these examples have a similar gate count (12, 11 and 13 respectively) and so will require a similar area.

Another property often required of circuits is low latency and a rough indication of the latency may be given by counting the maximal number of gates on a path any input may take through a circuit (the maximal is used here as the output of the circuit typically cannot be used until all signals have propagated through). This longest path (in terms of number of gates) may be called a "critical path". The critical path in the example of FIG. 5 would arguably be the path taken by v[6]. This signal passes through 6 gates (although NOT gates are typically much smaller than other gates and so may not be counted in some measures). In the other examples of FIGS. 6 and 7, the critical paths contain 8 and 7 gates, respectively. From this it can be seen that, assuming relatively equal arrival times of the inputs, the example shown in FIG. 5 would have the lowest latency.

As described above, in some examples, a design which matches the timing profile of preceding logic may be used. In such an example, the overall latency of the preceding logic together with the TZC may be minimized. This may involve matching the timing profile of the TZC with the preceding logic so that the full critical path (through both the preceding logic and TZC) can be considered.

The examples described above with reference to FIGS. 5-7 all used equations (1)-(3) to determine the precise arrangement of logic gates in the hardware logic 510, 610, 710 within a TZC(0) hardware logic block 202. In other examples, a different recursive forumulation of G(v) may be used instead of equation (1) at some or all of the levels of the splitting of the input string. This alternative recursion is based on determining that G(v)=1 if there is:

a trailing one in an odd index of the lower section; or
a trailing one in an odd index of the upper section and no one in an even index in the lower section.

As above, the terms 'odd' and 'even' are universal, whilst the term 'trailing' only refers to the part (e.g. the section or subsection) of the vector that is being considered.

The recursion for G(v) can therefore be written as:

$$G(v)=G(v_L)+(G(v_x) \cdot A(v_L)) \quad (4)$$

where:

$A(v)=1$ if there is no 1 in an even column of v
and $A(v)$ can be split as:

$$A(v)=A(v_H) \cdot A(v_L) \quad (5)$$

In some examples, only equations (4)-(5) may be used to determine the precise arrangement of logic gates in the hardware logic within a TZC(0) hardware logic block 202 and this results in a different arrangement of logic gates compared to using equations (1)-(3). In other examples, equations (1)-(5) may be used in order to provide an optimum arrangement of logic gates (for example, with higher Quality of Results or to reduce gate delay) e.g. using all of these equations at least once. The term Quality of Results is used herein to refer to the quality of the measurable properties of the circuit (e.g. one or more of circuit area, latency, power consumption, etc). The methods described herein enable use of a hybrid solution for the hardware logic within an TZC(i) hardware logic block 202 involving both equation (1) and equation (4) for G(v). This hybrid solution provides flexibility in the design (and hence in the synthesis) of the hardware logic and this in turn enables the arrangement of hardware logic elements (e.g. AND, OR and NOT gates) within the TZC(i) hardware logic blocks 202 to be optimized against various criteria, such as timing (e.g. reducing gate delays, accommodating delays associated with preceding logic, etc).

Figure 8:
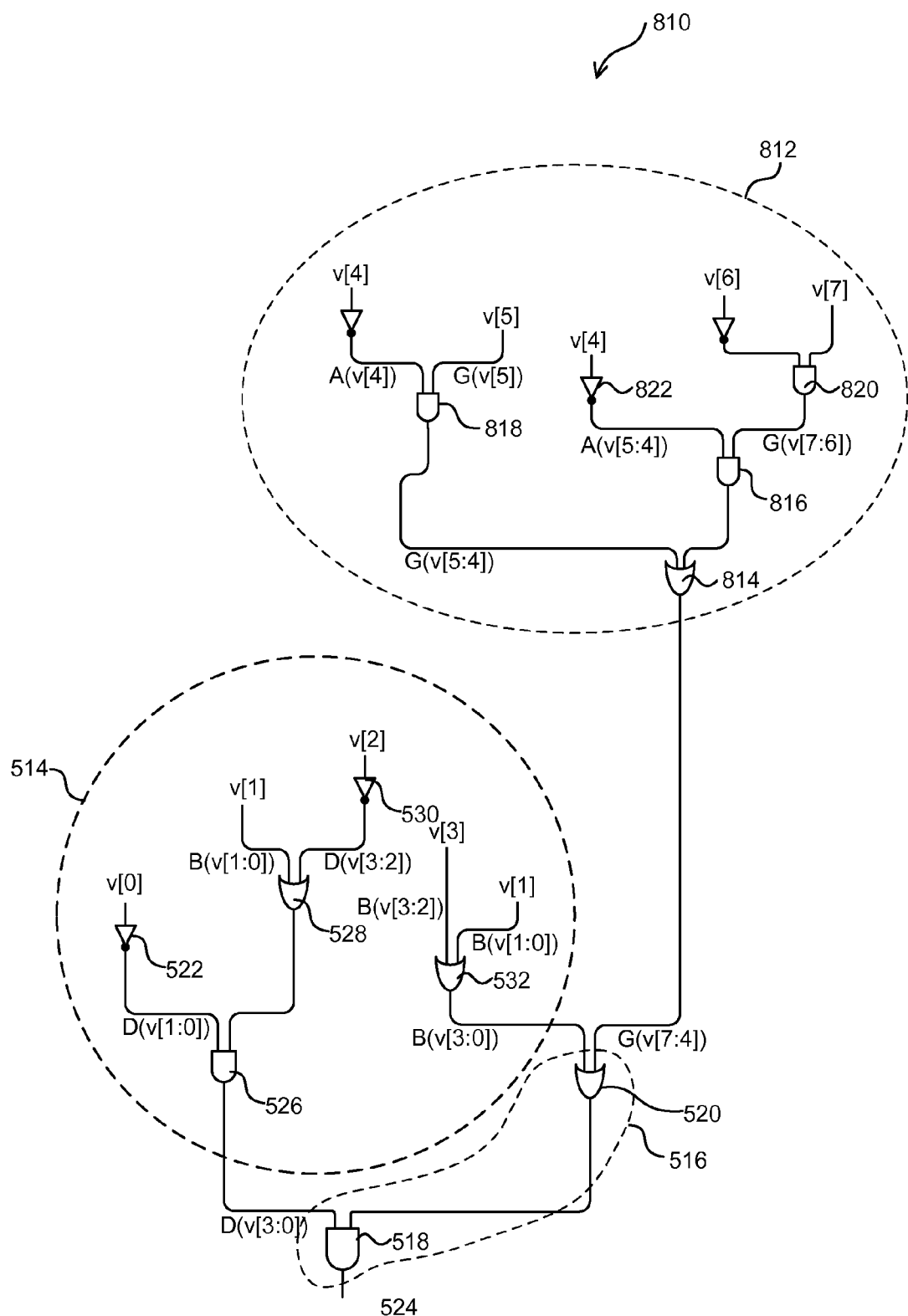
FIG. 8 shows a schematic diagram of an example of the hardware logic within a TZC(0) hardware logic block.

FIG. 8 shows another example of the hardware logic 810 within a TZC(0) hardware logic block 202. The hardware logic 810 comprises "high" section logic 812 which implements equations (4)-(5). The splitting of the input string 502, the "low" section logic 514 and combining logic 516 are the same as shown in FIG. 5 and described above. The "low" section logic 514 and combining logic 516 therefore implement equations (1)-(3).

The "high" section logic 812 takes the input bits 4-7 and generates G(v[7:4]) which is an input to OR gate 520 within the combining logic 516. Using equation (4) and dividing section 503 into two subsections 505-506:

$$G(v[7:4])=G(v[5:4])+(A(v[5:4])\cdot G(v[7:6]))$$

This results in one OR gate 814 and one AND gate 816. Using the same steps as above:

$$G(v[5:4])=G(v[4])+(A(v[4])\cdot G(v[5]))=0+(\overline{v[4]}\cdot v[5])=\overline{v[4]}\cdot v[5]$$

which results in one AND gate 818.
Similarly:

$$G(v[7:6])=G(v[6])+(A(v[6])\cdot G(v[7]))=0+(\overline{v[6]}\cdot v[7])=\overline{v[6]}\cdot v[7]$$

which results in one AND gate 820.
Using equation (5):

$$A(v[5:4])=A(v[5])\cdot A(v[4])=1\cdot \overline{v[4]}=\overline{v[4]}$$

which results in one NOT gate 822.

It can be seen that this results in hardware logic 810 which differs slightly from that shown in FIG. 5, with a few extra logic gates (e.g. one extra AND gate, if the $\overline{v[4]}$ value is reused to eliminate one NOT gate).

In the example shown in FIG. 8 it can be seen that equation (1) is used at the top level (i.e. the initial splitting of the string 502 into two sections 503-504); however at lower levels of granularity (e.g. the splitting of section 503 and subsequent splitting of subsections 505-506) equation (4) may be used to factorize G(v).

FIGS. 5-8 each show an example of the hardware logic 510, 610, 710, 810 within a TZC(0) hardware logic block 202. This or similar hardware logic may also be used (or reused) in other TZC(i) hardware logic blocks 202 for i>0 with the addition of i OR reduction stages 302. Considering next an TZC(1) hardware logic block 202, TZC(1) is equal to one (high) if there is a trailing one in an odd-indexed "pair" of columns, e.g. if there is a trailing one in positions 2,3 or 6,7 in the 8-bit example. This means that if adjacent bits in the input string are combined using OR gates (to generate one bit for each "pair" which will be a one if either bit is a one) then the same or similar hardware logic as described above for TZC(0) can be used to generate TZC(1). This combining of adjacent bits is performed by the first OR reduction stage.

Figure 10:
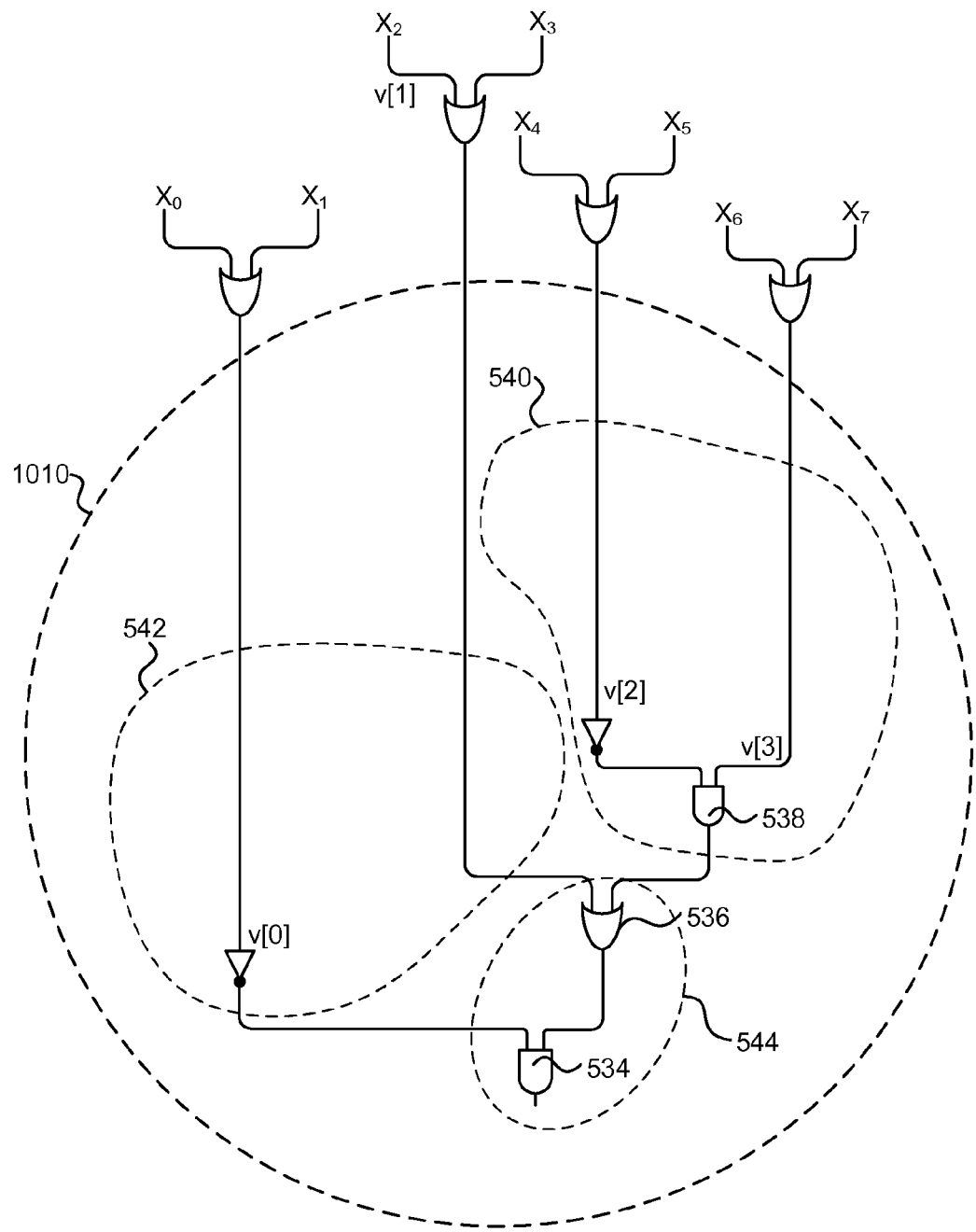
FIG. 10 shows a schematic diagram of an example of the hardware logic within a TZC(1) hardware logic block.

FIG. 9 is a schematic diagram showing the operation of a series of OR reduction stages 901-902 on an example 8-bit input string, $X_7X_6X_5X_4X_3X_2X_1X_0$. The first OR reduction stage 901 combines adjacent bits using OR gates 910 to produce four bits $Y_3Y_2Y_1Y_0$ and for a TZC(1) hardware logic block 202 where there is only a single OR reduction stage, these four bits comprise the input vector v[3:0] which is input to the hardware logic which is similar to that shown in FIGS. 5-8 and described above. An example of such hardware logic 1010 is shown in FIG. 10 following a single OR reduction stage 901 and it can be seen that this hardware logic 1010 is the same as the "high" section logic 512 shown in FIG. 5. As described above, by splitting the string $Y_3Y_2Y_1Y_0$ output by the OR reduction stage 901 in a different way, the hardware logic 1010 may be implemented differently, e.g. using the logic 626 which calculates G(v[7:4]) in FIG. 6 or the logic 812 which calculates G(v[7:4]) in FIG. 8. As described above, the arrangement of the hardware logic which processes the output of the OR reduction stage may be based solely on equations (1)-(3), solely on equations (4)-(5) or using a combination of all equations (1)-(5), e.g. with equation (1) being used at the top level (i.e. when splitting string $Y_3Y_2Y_1Y_0$) and equation (4) being used at least once at a lower level (e.g. when splitting a section or a subsection of the string $Y_3Y_2Y_1Y_0$).

Considering next an TZC(2) hardware logic block 202, TZC(2) is equal to one (high) if there is a trailing one in an odd-indexed group of four columns, e.g. if there is a trailing one in positions 4-7 in the 8-bit example. This means that if the input string passes through two OR reduction stages (to generate one bit for each group of four columns which will be a one if any of the four bits is a one) then the same or similar hardware logic as described above for TZC(0) can be used to generate TZC(2). FIG. 9 shows two OR reduction stages 901-902 and the output of the first stage 901 ($Y_3Y_2Y_1Y_0$) is the input to the second stage 902 (i.e. the OR reduction stages are arranged in series). The second OR reduction stage 902 in FIG. 9 combines adjacent bits of the string $Y_3Y_2Y_1Y_0$ (output from the first OR reduction stage 901) using OR gates 910 to produce two bits $Z_1Z_0$ and for a TZC(2) hardware logic block 202 where there are two OR reduction stages (i=2), these two bits comprise the input vector v[1:0] which is input to the hardware logic which is similar to that shown in FIGS. 5-8 and described above. As described above, the arrangement of the hardware logic which processes the output of the OR reduction stage may be based solely on equations (1)-(3), solely on equations (4)-(5) or using a combination of all equations (1)-(5).

Where the input string comprises more than eight bits, there may be additional TZC(i) hardware logic blocks 202 for i>2 and there may correspondingly be more than two OR reduction stages. Considering subsequent TZC(i) hardware logic blocks 202 (i>2), TZC(3) is equal to one (high) if there is a trailing one in an odd-indexed group of 8 columns, TZC(4) is equal to one (high) if there is a trailing one in an odd-indexed group of 16 columns. It will be appreciated that the number of TZC(i) hardware logic blocks 202 that are used will depend on the number of bits in the input string. For example, an 8-bit input string only uses 3 TZC(i) hardware logic blocks 202 as the maximum value of the TZC result is 7 which can be represented in three bits (111), similarly, a 16-bit input string only uses 4 TZC(i) hardware logic blocks 202 as the maximum value of the TZC result is 15 which can be represented in four bits (1111).

In examples where the input string comprises an odd number of bits, an OR reduction stage may not operate on the most significant bit of the input string. For example, if the string comprises 7 bits $X_6X_5X_4X_3X_2X_1X_0$, the first OR reduction stage may combine these values as follows: $Y_2=X_5+X_4$, $Y_1=X_3+X_2$, $Y_0=X_1+X_0$ and the most significant bit is not affected ($Y_3=X_6$). The same applies where the input to a subsequent OR reduction stage comprises an odd number of bits.

Where an TZC comprises more than one TZC(i) hardware logic block 202, there may be reuse of values and/or hardware logic between TZC(i) hardware logic blocks 202. FIG. 11 shows a schematic diagram of an example TZC 1100 which comprises 4 TZC(i) hardware logic blocks 202 and in which the OR reduction stages are shared between TZC(i) hardware logic blocks 202. For example, if the input bit comprises 16-bits, the TZC(0) hardware logic block 1101 will receive a string v[15:0], the OR reduction stage 302 in TZC(1) hardware logic block 1102 will reduce this to an 8-bit string v[7:0] which will be recursively divided within that hardware logic block 1102 to generate TZC(1). The 8-bit string will also be input to the TZC(2) hardware logic block 1103 where the OR reduction stage 302 reduces the 8-bit string to a 4-bit string which it outputs to its own "high" and "low" section hardware logic 304, 306 as v[3:0] and also to the final TZC(3) hardware logic block 1104. The final TZC(3) hardware logic block 1104 comprises another OR reduction stage 302 which outputs a 2-bit string v[1:0] and generates LZC(3).

By sharing hardware logic between TZC(i) hardware logic blocks as shown in FIG. 11, there is a reduction in the overall area of the hardware logic within the TZC.

Although the above description refers to counting trailing zeros (starting from the least significant bit), the same techniques may also be applied to counting leading zeros (starting from the most significant bit in an input string). As described above, this may be implemented by connecting the circuitry such that the input bits are reversed in order, (e.g. such that the true MSB of the input number is connected to the LSB input of the TZC). Alternatively, equations (1)-(5) may be modified to swap the H and L subscripts, change the notion of trailing in each function and instead of looking for odd or even indices, look for an odd or even count of columns from the MSB. For example, equation (1) may become $$G'(v) = D'(v_H) \cdot (B'(v_H) + G'(v_L)) \quad (1')$$

where:

$D'(v)=1$ if there is no leading 1 in an even count of columns from the MSB of v $B'(v)=1$ if there is a 1 in an odd count of columns from the MSB of v FIGS. 5-10 show specific arrangements of logic gates (in particular AND, OR and NOT gates). It will be appreciated that there may be alternative arrangements of logic gates which achieve the same logic functions as those shown.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A zero counter comprising a plurality of hardware logic blocks each arranged to calculate one bit of an output value, the output value corresponding to a number of trailing or leading zeros in an input string, wherein each hardware logic block in the plurality of hardware logic blocks is arranged to calculate a bit of the output value and comprises:

a low section hardware logic block comprising inputs arranged to receive bits from a first section of a received string, the first section including a least significant bit in the input string, and one or more logic gates arranged to combine the received bits and generate at least one output;
a high section hardware logic block comprising inputs arranged to receive bits from a second section of the received string, the second section including a most significant bit in the received string, and one or more logic gates arranged to combine the received bits and generate at least one output; and
combining logic arranged to combine the outputs of the two section hardware logic blocks and generate a bit of the output value.

2. The zero counter according to claim 1, wherein the first and second sections of the input string are non-overlapping.

3. The zero counter according to claim 1, wherein the first and second sections of the input string comprise all the bits in the received string.

4. The zero counter according to claim 1, wherein the zero counter comprises a trailing zero counter and the output value corresponds to a number of trailing zeros.

5. The zero counter according to claim 4,
wherein a low section hardware logic block in one of the plurality of hardware logic blocks is arranged to generate two outputs, the first output, $D(v_L)$, being equal to one if there is no trailing one in an even column of the received section and the second output, $B(v_L)$, being equal to one if there is a one in an odd indexed column of the received section, and
wherein a high section hardware logic block in the same one of the plurality of hardware logic blocks is arranged to generate one output, $G(v_H)$, being equal to one if there is a trailing one in an odd indexed column of the received section, and
wherein the combining logic in the same one of the plurality of hardware logic blocks is arranged to generate the bit of the output value by combining the outputs of the high and low section hardware logic blocks using:

$$D(v_L) \cdot (B(v_L) + G(v_H))$$

where:
· represents an AND function, and
+ represents an OR function.

6. The zero counter according to claim 4,
wherein the low section hardware logic block in each of the plurality of hardware logic blocks is arranged to generate two outputs, the first output, $D(v_L)$, being equal to one if there is no trailing one in an even column of the received section and the second output, $B(v_L)$, being equal to one if there is a one in an odd indexed column of the received section, and
wherein the high section hardware logic block in each of the plurality of hardware logic blocks is arranged to generate one output, $G(v_H)$, being equal to one if there is a trailing one in an odd indexed column of the received section, and
wherein the combining logic each of the plurality of hardware logic blocks is arranged to generate the bit of the output value by combining the outputs of the high and low section hardware logic blocks using:

$$D(v_L) \cdot (B(v_L) + G(v_H))$$

where:
· represents an AND function, and
+ represents an OR function.

7. The zero counter according to claim 4,
wherein a low section hardware logic block in one of the plurality of hardware logic blocks is arranged to generate two outputs, the first output, $G(v_L)$, being equal to one if there is a trailing one in an odd indexed column of the received section and the second output, $A(v_L)$, being equal to one if there is not a one in any even indexed column of the received section, and
wherein a high section hardware logic block in the same one of the plurality of hardware logic blocks is arranged to generate one output, $G(v_H)$, being equal to one if there is a trailing one in an odd indexed column of the received section, and
wherein the combining logic in the same one of the plurality of hardware logic blocks is arranged to generate the bit of the output value by combining the outputs of the high and low section hardware logic blocks using:

$$G(v_L) + (G(v_H) \cdot A(v_L)).$$

8. The zero counter according to claim 4, wherein at least one of the high or low section hardware logic blocks comprises:
a low subsection hardware logic block comprising inputs arranged to receive bits from a first subsection of a section of a string, the first subsection including a least significant bit in the section and one or more logic gates arranged to combine the received bits and generate at least one output;
a high subsection hardware logic block comprising inputs arranged to receive bits from a second subsection of a section of a string, the second subsection including a most significant bit in the section and one or more logic gates arranged to combine the received bits and generate at least one output, wherein the first and second subsections of the section are non-overlapping and comprise all the bits in the section; and
combining logic arranged to combine the output of the two subsection hardware logic blocks and generate an output of the section hardware logic block.

9. The zero counter according to claim 8, wherein a low subsection hardware logic block in one of the high or low section hardware logic blocks is arranged to generate two outputs, the first output, $D(v_{LS})$, being equal to one if there is no trailing one in an even column of the received subsection and the second output, $B(v_{LS})$, being equal to one if there is a one in an odd indexed column of the received subsection, and
wherein a high subsection hardware logic block in the same one of the high or low section hardware logic blocks is arranged to generate one output, $G(v_{HS})$, being equal to one if there is a trailing one in an odd indexed column of the received subsection, and
wherein the combining logic in the same one of the high or low section hardware logic blocks is arranged to generate the output of the section hardware logic block by combining the outputs of the high and low subsection hardware logic blocks using:

$$D(v_{LS}) \cdot (B(v_{LS}) + G(v_{HS})).$$

10. The zero counter according to claim 8, wherein a low subsection hardware logic block in one of the high or low hardware section logic blocks is arranged to generate two outputs, the first output, $G(v_{LS})$, being equal to one if there is a trailing one in an odd indexed column of the received subsection and the second output, $A(v_{LS})$, being equal to one if there is not a one in any even indexed column of the received subsection, and wherein a high subsection hardware logic block in the same one of the high or low section hardware logic blocks is arranged to generate one output, $G(v_{HS})$, being equal to one if there is a trailing one in an odd indexed column of the received subsection, and wherein the combining logic in the same one of the high or low section hardware logic blocks is arranged to generate the bit of the output of the section hardware logic block by combining the outputs of the high and low subsection hardware logic blocks using:

$$G(v_{LS})+(G(v_{HS})\cdot A(v_{LS})).$$

11. The zero counter according to claim 8, wherein at least one of the high or low subsection hardware logic blocks comprises:

a further low subsection hardware logic block comprising inputs arranged to receive bits from a first further subsection of a subsection of a string, the first further subsection including a least significant bit in the subsection and one or more logic gates arranged to combine the received bits and generate at least one output;

a further high subsection hardware logic block comprising inputs arranged to receive bits from a second further subsection of the subsection of a string, the second further subsection including a most significant bit in the subsection and one or more logic gates arranged to combine the received bits and generate at least one output, wherein the first and second further subsections of the subsection are non-overlapping and comprise all the bits in the subsection; and combining logic arranged to combine the output of the two further subsection hardware logic blocks and generate an output of the subsection hardware logic block.

12. A computer readable storage medium having encoded thereon computer readable program code for generating a processor comprising a zero counter, the zero counter comprising a plurality of hardware logic blocks each arranged to calculate one bit of an output value, the output value corresponding to a number of trailing or leading zeros in an input string, wherein each hardware logic block in the plurality of hardware logic blocks is arranged to calculate a bit of the output value and comprises:

a low section hardware logic block comprising inputs arranged to receive bits from a first section of a received string, the first section including a least significant bit in the received string, and one or more logic gates arranged to combine the received bits and generate at least one output;

a high section hardware logic block comprising inputs arranged to receive bits from a second section of the received string, the second section including a most significant bit in the received string, and one or more logic gates arranged to combine the received bits and generate at least one output; and combining logic arranged to combine the outputs of the two section hardware logic blocks and generate a bit of the output value.

13. The computer readable storage medium according to claim 12, wherein the first and second sections of the input string are non-overlapping.

14. The computer readable storage medium according to claim 12, wherein the first and second sections of the input string comprise all the bits in the received string.

\* \* \* \* \*